United States Patent
Dawson, V et al.

(10) Patent No.: US 11,631,081 B2
(45) Date of Patent: Apr. 18, 2023

(54) FLEXIBLE IDENTITY AND ACCESS MANAGEMENT PIPELINE

(71) Applicant: Okta, Inc., San Francisco, CA (US)

(72) Inventors: William J. Dawson, V, San Francisco, CA (US); Thomas Abbott, Leesburg, CA (US); Trevor Thompson, Austin, TX (US); Jonathan R. Todd, Boulder, CO (US); Karl McGuinness, Oakland, CA (US)

( * ) Notice: Subject to any disclaimer, the term of this patent is extended or adjusted under 35 U.S.C. 154(b) by 0 days.

(21) Appl. No.: 17/219,684

(22) Filed: Mar. 31, 2021

(65) Prior Publication Data

US 2021/0312441 A1 Oct. 7, 2021

Related U.S. Application Data

(60) Provisional application No. 63/003,866, filed on Apr. 1, 2020.

(51) Int. Cl.
*G06F 21/31* (2013.01)
*G06F 21/30* (2013.01)
(Continued)

(52) U.S. Cl.
CPC ....... *G06Q 20/401* (2013.01); *H04L 63/0876* (2013.01); *H04L 63/126* (2013.01)

(58) Field of Classification Search
None
See application file for complete search history.

(56) References Cited

U.S. PATENT DOCUMENTS

| 9,426,182 B1 | 8/2016 | Zeljko et al. |
| 9,887,992 B1 | 2/2018 | Venkat et al. |

(Continued)

FOREIGN PATENT DOCUMENTS

| JP | 2017-534125 A | 11/2017 | |
| WO | WO-2015047338 A1 * | 4/2015 | ............ G06F 21/45 |

OTHER PUBLICATIONS

On Security Level Usage in Context-aware Role-based Access Control. Trnka. ACM. (Year: 2016).*

(Continued)

*Primary Examiner* — Venkat Perungavoor
(74) *Attorney, Agent, or Firm* — Holland & Hart LLP

(57) ABSTRACT

A system and a method are disclosed for context-based verification flows for digital identity verification. A context-based verification system provides flexible identification procedures for various enterprises that adapted to the enterprises' services, the enterprises' customers, and these customers' needs. For example, the context-based verification system determines a first and second verification flows associated with a first enterprise and a third verification flow associated with a second enterprise. These verification flows include context parameters and verification parameters. The context-based verification system determines context parameters of a request, or "request context parameters," when a user requests to interact with the first enterprise and determines a verification flow associated with context parameters that substantially match these request context parameters. The context-based verification system may determine that the first verification flow's context parameters substantially match the request context parameters and use the first verification flow's verification parameters to verify the user's identity.

20 Claims, 6 Drawing Sheets

(51) Int. Cl.
*G06Q 20/40* (2012.01)
*H04L 9/40* (2022.01)
*G06F 21/45* (2013.01)

(56) References Cited

U.S. PATENT DOCUMENTS

| | | | |
|---|---|---|---|
| 2012/0191575 A1 | 7/2012 | Vilke et al. | |
| 2015/0135258 A1 | 5/2015 | Smith et al. | |
| 2019/0327226 A1* | 10/2019 | Brown | H04L 63/102 |
| 2020/0019679 A1* | 1/2020 | Asghari-Kamrani | G06Q 20/341 |
| 2020/0184049 A1* | 6/2020 | Toth | H04L 67/306 |
| 2022/0021711 A1* | 1/2022 | Marsh | H04L 9/3247 |
| 2022/0210156 A1* | 6/2022 | Shah | H04L 63/0884 |

OTHER PUBLICATIONS

Access Control Mechanisms for Inter-Organizational Workflow. Kang. ACM. (Year: 2001).*

A semi-automatic approach for workflow staff assignment. Liu. Elsevier. (Year: 2008).*

A Study on Access Control Model for Context-Aware Workflow. Park. IEEE. (Year: 2009).*

PCT International Search Report and Written Opinion, PCT Application No. PCT/US2021/025251, dated Jul. 26, 2021, nine pages.

Okta, "Introducing the Okta Identity Engine: Customizable Building Blocks for Every Identity Experience," Apr. 2, 2019, five pages, [Online] [Retrieved on May 20, 2021] Retrieved from the Internet <URL: https://www.okta.com/press-room/press-releases/introducing-the-okta-identity-engine-customizable-building-blocks-for-every-identity-experience/>.

Sawma, E., "Introducing the Okta Identity Engine," Apr. 2, 2019, six pages, [Online] [Retrieved on May 20, 2021] Retrieved from the Internet <URL: https://www.okta.com/blog/2019/04/okta-identity-engine/>.

Youtube.com, "Oktane19: Roadmap Why Building Customer Identity is Hard (Use Okta Instead)," Apr. 3, 2019, one page, [Online] [Retrieved on May 20, 2021] Retrieved from the Internet <URL: https://youtu.be/sDEux5h1 LGw?t=868>.

Youtube.com, "Opening Keynote: Trust: The New Frontier in Technology," Okta, Apr. 3, 2019, one page, [Online] [Retrieved on May 20, 2021] Retrieved from the Internet <URL: https://youtu.be/JpvLgDZa5jc?t=2840>.

* cited by examiner

Edit Rule

Rule Name [                    ]

IF

[IF] User type is — One of the following types: ▼ (401a)
[Employee x] (402a)

[AND] Group membership includes — At least one of the following groups: ▼ (401b)
[Group 1 x] (402b)

[AND] Request is from the zone — At least one of the following zones: ▼ (401c)
[On-premises x] (402c)

[AND] Device trust status is — Trusted ▼ (401d)
(402d)

403 — ⊕ Customize

THEN

[THEN] Access is
○ Denied
● Allowed after successful authentication

[AND] Authenticate using
[Password]  [x]
→ Additional Authentication Method #1
OR
→ Additional Authentication Method #2
OR
→ Additional Authentication Method #3
[Add]

404

[Save] [Cancel]

*FIG. 4*

Edit Rule

Rule Name [                              ]

IF

[IF] — One of the following types: ▼ — 501a
User type is — [Employee x] — 502a

[AND] — Any app ▼ — 501b
Target app is — 502b

[AND] — At least one of the following zones: ▼ — 501c
Request is from the zone — [On-premises x] — 502c 503 — [+ Customize]

THEN

[THEN]
Enrollment is
○ Not allowed
○ Optional
● Required

[AND]
Active users must authenticate with
○ Any enrolled credential
● One of the following credentials
   ☑ Email
   ☑ SMS
   ☐ Security Question

504

[Save] [Cancel]

FLEXIBLE IDENTITY AND ACCESS MANAGEMENT PIPELINE

CROSS REFERENCE TO RELATED APPLICATIONS

This application claims the right of priority based on U.S. Provisional Application No. 63/003,866, filed Apr. 1, 2020, which is incorporated by reference in its entirety.

TECHNICAL FIELD

The disclosure generally relates to the field of digital security, and more specifically, to digital identification with customizable identification verification flows.

BACKGROUND

Digital access to resources provides convenience while introducing certain security requirements or policies for digital identification. Digital identification applies to services such as user identification, authentication, enrollment, activation, and authorization. Passwords, personally identifiable information (e.g., a social security number), multifactor authentication, or a combination thereof are some ways to enable digital identification. Different enterprises may have different security policies depending on their and their user's needs. Current policies are inflexible and do not adapt to the context in which a user and an enterprise are interacting while meeting the appropriate security requirement. For example, an ecommerce website may require password authorization of both a user who is browsing available products and a user who is making a purchase with credit card information. While digital identification using passwords may be a security policy necessary for making a purchase, the same security policy may not apply to browsing products. In turn, the user who is only browsing may feel overburdened when using the ecommerce website and take his patronage to another ecommerce enterprise.

Existing solutions for enterprises to create and manage customized security policies involve identification services from multiple security providers because no identity product can be pre-defined to meet the requirement of supporting a variety of use cases with different contexts. Additionally, existing solutions require enterprise administrators to develop policies using computer code, which may not be readily accessible to an administrator without coding skills, vary in efficiency depending on the competency of the code writer, and require time and labor to debug.

SUMMARY

Described herein are embodiments of systems and methods for flexible security solutions using a context-based verification system. The context-based verification system enables an enterprise to customize multiple verification flows to adapt to both the users' and enterprise's needs. In particular, the context-based verification system uses the context of a request from a user to interact with the enterprise to determine an appropriate policy to verify the user's identity. For example, the context of the request can include information such as the Internet Protocol (IP) address from which the request was received. The context-based verification system may then identify a policy that specifies a manner of identity verification for the particular IP address. For example, requests from that IP address are required to input a password while other IP addresses are required to input both a password and complete a challenge-response test. To improve accessibility for enterprise administrators to create and manage an enterprise's verification flows, the context-based verification system may provide a graphical user interface (GUI) in addition to or in place of editing software code (e.g., a software development kit and/or application programming interface) to enable the creation and editing of verification flows characterized by at least an identity verification method and a context for which the identity verification method is to be applied. In the foregoing ways, the context-based verification system provides a security solution for an enterprise to create and manage customized verification flows using a single, flexible system that meets the requirement of supporting a variety of identification use cases with different contexts.

The context-based verification system may provide customized identification based on the context of a user's request by establishing verification flows with enterprises and applying those verification flows to verify the identity of the user. For example, the context-based verification system provides context parameters to both a first enterprise and a second enterprise, where the context parameters represent types of request context for requesting to interact with an enterprise. The context-based verification system may also provide verification parameters to the enterprises, where the verification parameters represent types of identity verification. The term "verification flow" is used herein to refer to a combination of context and verification parameters to enable a context-based identity verification process, where the verification parameters can correspond to a policy. As referred to herein, the term "policy" refers to a set of one or more rules (e.g., verification parameters) for accessing a resource that may be customized for an enterprise's needs (e.g., for user authentication or user enrollment).

Using the context parameters and verification parameters, the context-based verification system may determine first and second verification flows associated with the first enterprise and a third verification flow associated with the second enterprise. The verification flows include respective sets of the context and verification parameters. For example, the first enterprise selects some of the context parameters to correspond to selected verification parameters to create a verification flow where a user's identity is to be verified with the selected verification parameters when the selected context parameters are met. The context-based identification may receive a request from a user to interact with the first enterprise and determine request context parameters of the request (e.g., context parameters characterizing the user's request). Having access to a database of verification flows, the context-based verification system may determine which verification flows' context parameters substantially match the request context parameters. For example, the context-based verification system may determine whether the request context parameters substantially match a set of context parameters of the first verification flow. If the request context parameters do substantially match the set of context parameters of the first verification flow, the context-based verification system verifies the identity of the user using the verification parameters of the first verification flow. If the request context parameters instead substantially match a set of context parameters of the second verification flow, the context-based verification system verifies the identity of the user using the verification parameters of the second verification flow. In this way, an enterprise can manage multiple verification flows for different request contexts and/or identity verification methods with the context-based verification system.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 depicts a GUI for creating a verification flow for authentication using the context-based verification system of FIG. 1, in accordance with at least one embodiment.

FIG. 5 depicts a GUI for creating a verification flow for enrollment using the context-based verification system of FIG. 1, in accordance with at least one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Context-Based Verification System Environment

Figure 1:
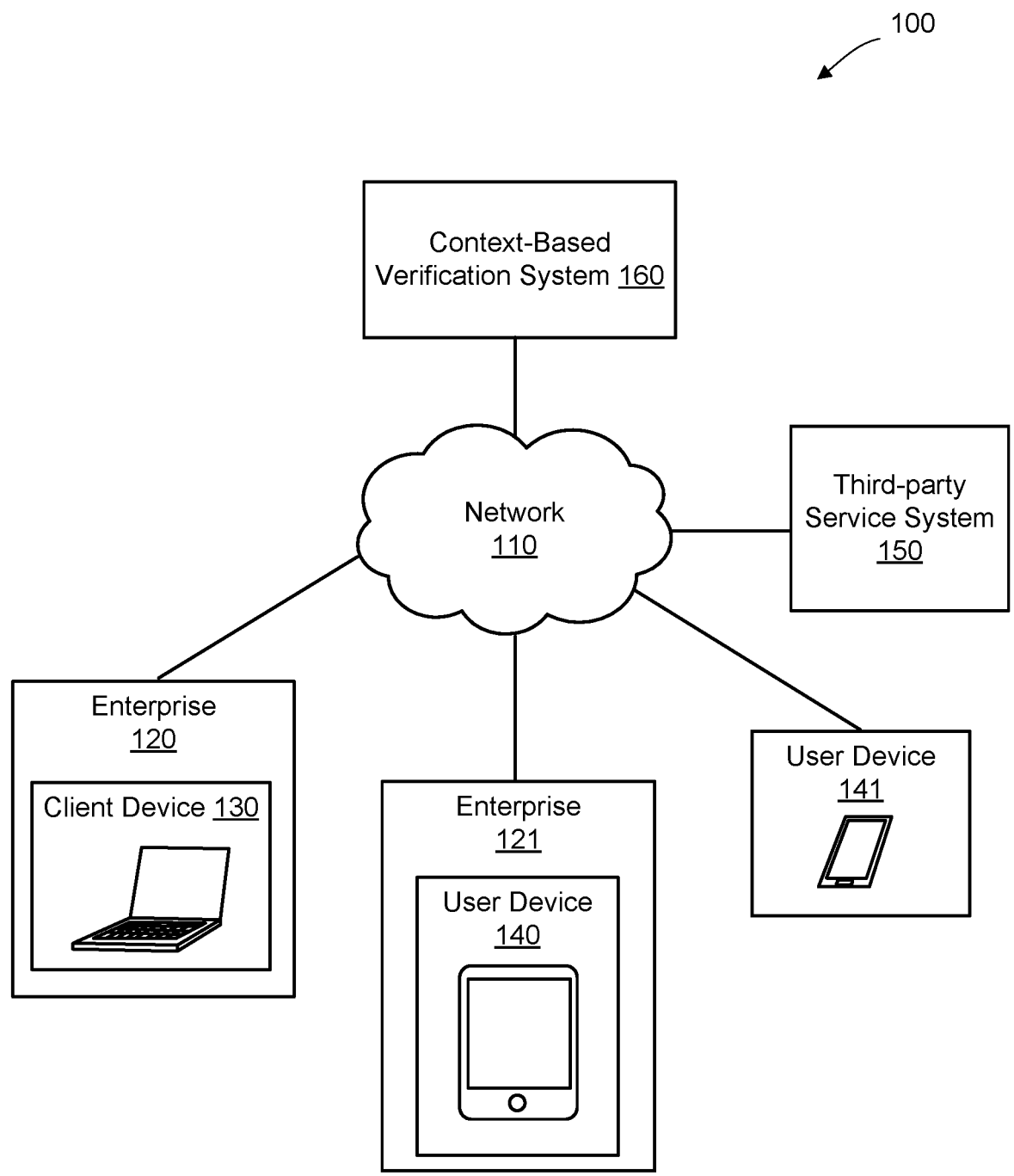
FIG. 1 is a network diagram illustrating a communication environment in which a context-based verification system operates, in accordance with at least one embodiment.

FIG. 1 is a network diagram illustrating a communication environment 100 in which a context-based verification system 160 operates. The communication environment 100 includes a network 110, an enterprise 120 associated with a client device 130, an enterprise 121 associated with a user device 140, a user device 141, a third-party service system 150, and the context-based verification system 160. As referred to herein, the term "client device" refers to a computing device used by a member of an enterprise receiving identity verification service from the verification system 160 and the term "user device" refers to a computing device used to request an interaction with an enterprise. Likewise, the term "client" refers to a recipient of the services of the verification system 160 and the term "user" refers to a recipient of the services of a client. In alternative configurations, different and/or additional components may be included in the communication environment 100. For example, a database may be communicatively coupled to the context-based verification system 160 such that verification credentials used by the verification system 160 are not necessarily stored locally. Although requests to interact are described herein as being between a user device, or user, and an enterprise, requests between any suitable permutation of enterprise and user device (e.g., enterprise and enterprise) may be fulfilled by the context-based verification system described herein. Requested interactions with an enterprise may include a request to access a resource provided by the enterprise, enroll with the enterprise, activate a resource with the enterprise, authorize another user to interact with the enterprise, or any suitable combination thereof.

The network 110 may serve to communicatively couple the context-based verification system 160, the enterprises 120 and 121 (including the client device 130 and the user device 140 associated with the respective enterprises), the user device 141, and the third-party service system 150. Communication via the network 110 may comprise any combination of local area and/or wide area networks, using wired and/or wireless communication systems. In some embodiments, the network 110 uses standard communications technologies and/or protocols. For example, the network 110 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any suitable format, such as hypertext markup language (HTML) or extensible markup language (XML). In some embodiments, all or some of the communication links of the network 110 may be encrypted using any suitable technique or techniques.

The enterprises 120 and 121 may be any enterprise that maintains user accounts to provide a service to the corresponding users. For example, an enterprise may be a retail business, Internet retailer, small business, bureaucratic agency, educational institution, consulting firm, healthcare provider, bank, or any suitable combination thereof. In some embodiments, an enterprise is a collection of smaller enterprises that are not necessarily co-located (e.g., the smaller enterprises are not on the same local area network as one another). An enterprise may be communicatively coupled to a client device. For example, the enterprise 120 is communicatively coupled to the client device 130 because the client device 130 is a laptop of an employee of the enterprise 120 who is using the Wi-Fi network hosted by the enterprise 120 to interact with the verification system 160. An enterprise may be communicatively coupled to a user device. For example, the enterprise 121 is communicatively coupled to the user device 140 because the user device 140 is a tablet of an employee of the enterprise 121 who is using the Wi-Fi network hosted by enterprise 121 to interact with enterprise 121. In some embodiments, a client device and a user device may be the same device. For example, an employee of the enterprise 120 may use his computing device to interact with the enterprise 120 and with the verification system 160. In some embodiments, enterprises 120 and 121 are independent enterprises such that the verification system 160 may maintain a unique collection of verification flows for each of the enterprises.

The user device 141 may be communicatively coupled with at least one of the enterprises 120 and 121 through the network 110. For example, a user could be on a train to work and use her mobile phone requests to interact with the enterprise 120 (e.g., to check her work e-mail hosted by the enterprise 120) through a cellular network. Enterprises may include retail businesses that are communicatively coupled with the verification system 160 to facilitate a customer identity and access management (CIAM) application. For example, enterprise 120 may be a retailer from which the user of the user device 141 is purchasing goods. To provide the user access to the user's secured account, the retailer leverages the verification system 160 and authorizes the user to access personal information (e.g., billing and shipping addresses) during the shopping experience.

The client device 130 and the user devices 140 and 141 are computing devices capable of receiving user input as well as transmitting and/or receiving data via a network. In some embodiments, at least one of these devices is a conventional computer system, such as a desktop or a laptop computer. Alternatively, a client device and/or user device may be a device having computer functionality, such as a smartphone, tablet, personal computer, personal digital assistant (PDA), laptop, mobile telephone, or another suitable device. A client device is configured to communicate with the context-based verification system 160 via the network 110, for example, using a native application executed by the device or through an application programming interface (API) running on a native operating system of the client device, such as IOS® or ANDROID™. In another example, a client device is configured to communicate with the verification system 160 via an API running on the verification system 160.

The third-party service system 150 may be the system of any service provider involved with the context-based verification system 160 to implement user identity verification. For example, the third-party service system 150 might be a fraud mitigation platform that assesses the risk included in a potential interaction between an enterprise and a user device. The context-based verification system 160 may send information regarding the user device's request to access the enterprise to the third-party service system 150. In turn, the third-party service system 150 may perform an evaluation of the user device and return a risk score to the context-based verification system 160 through the network 110. Additional examples of third-party services include, but are not limited to, identity proofing, content management, and specialized authentication. Identity proofing services may include documentation identification or information verification systems. Content management services may retrieve content assets related to user experience such as enterprise images, colors, and/or logos. Specialized authentication services may perform a specific type of authentication such as biometric authentication (e.g., retinal scans).

The context-based verification system 160 may receive requests to generate verification flows and verify users from enterprises 120 and 121 through network 110. For example, one enterprise serving different types of users may need a different way to verify each of the types of users. The context-based verification system 160 enables the enterprise to create customizable verification flows to verify its different users. In some embodiments, the context-based verification system 160 is web-based, serving enterprises from a remote server and not necessarily from a software application stored in a client device.

A verification flow may be implemented by the context-based verification system 160 using expression programming languages. Using an expression language, as opposed to languages such as JSON or XML, the context-based verification system 160 may receive various proprietary formats of risk scoring solutions to be analyzed against a verification flow and output a decision to an enterprise to take action.

In one non-limiting example, the verification system 160 may implement multiple formats of risk scoring solutions, analyze the risk scoring information obtained against a customized verification flow, and generate an aggregate decision about whether authentication should proceed or not. A first risk scoring solution may include a bank's custom risk evaluation for payments made using credit cards that the bank has issued, where the verification system 160 may receive the bank's custom risk evaluation to score each payment from 0 to 100. For a second risk scoring solution, the verification system 160 may receive risk information from a third-party service that describes the payee (e.g., location data, years of operation, etc.). A third risk scoring solution may include the assessment of a user device used to make the payment to the payee, where the verification system 160 receives information about the user device and generates a fractional score from 0 to 1 to signify how secure that device is. The payment scores, payee information, and fractional device security score may be evaluated based on a particular verification flow to determine whether authentication should occur according to the verification flow.

In particular, the expression language may be a custom syntax that allows the context-based verification system 160 to expose relevant context about the HTTP request, the user or user device, the target resource, and other attributes about a user's request to an enterprise. While expression language may expose relevant context depending on how the expression language is implemented, in one example, the expression language can be implemented as a naming scheme that exposes properties or context about the HTTP request. For example, evaluating expressions like "request.headers.my-custom-header" may allow the verification system 160 to determine an HTTP header value for "my-custom-header." Likewise, the verification system 160 may determine a risk score for an aggregated context from an expression such as "content.risk.score." In some embodiments, the context-based verification system 160 maintains databases and software modules for maintaining a verification flow for an enterprise and verifying the identity of an enterprise's user using the policy of the verification flow. The context-based verification system 160 is further described in the description of FIG. 2.

Context-Based Verification System Overview

Figure 2:
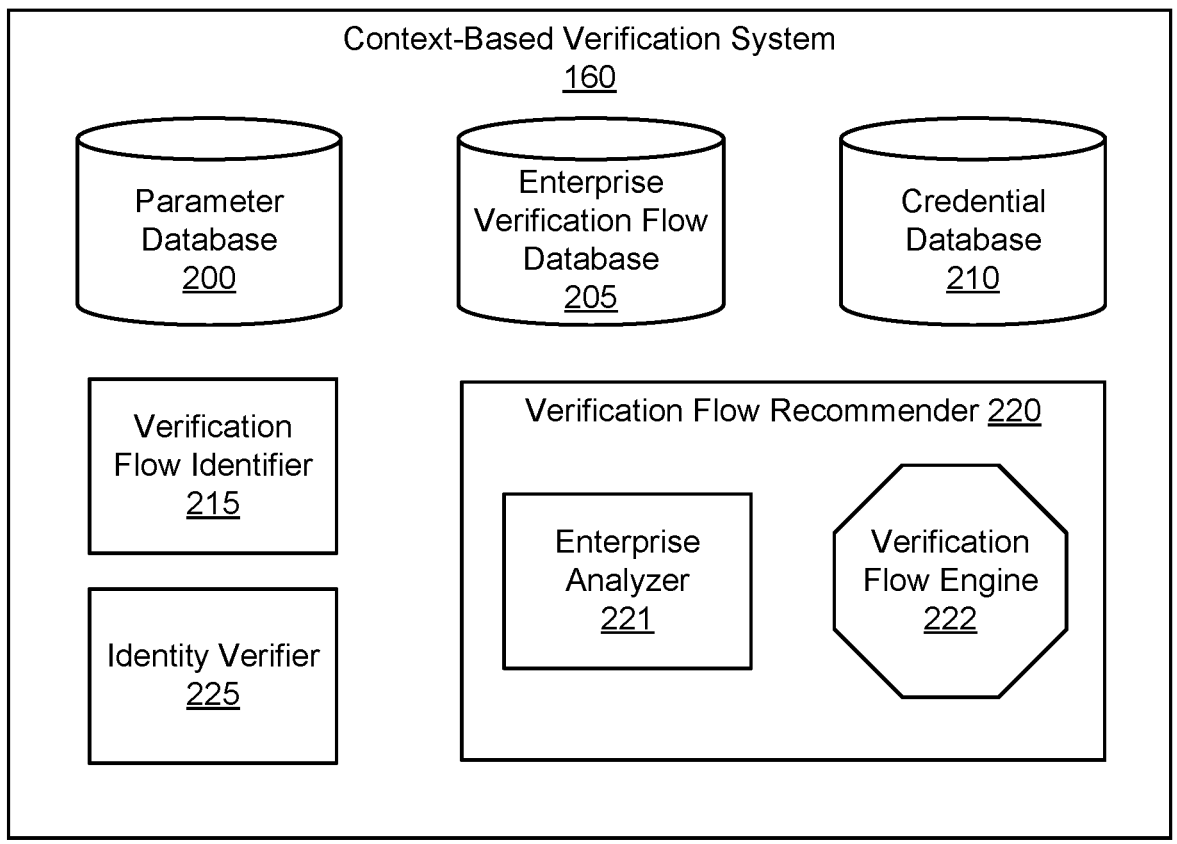
FIG. 2 is a block diagram of the context-based verification system of FIG. 1, in accordance with at least one embodiment.

FIG. 2 is a block diagram of the context-based verification system 160 of FIG. 1. The context-based verification system 160 includes multiple software modules: a verification flow identifier 215, a verification flow recommender 220, and an identity verifier 225. The verification flow recommender 220 includes software submodules: an enterprise analyzer 221 and a context-driven verification flow engine 222. The context-based verification system 160 may have access to local databases such as a parameter database 200, an enterprise verification flow database 205, and a credential database 210. In some embodiments, context-based verification system 160 includes additional, fewer, or different components for various functions. For example, at least one of databases 200-210 may be stored remotely and accessible through the network 110.

The stored data in the parameter database 200 includes records of verification parameters and context parameters. Verification parameters may be ways to verify the identity of a user. In some embodiments, verification parameters include both verification actions and verification procedures (e.g., a sequence of verification actions). Verification actions may involve an email, a text message (e.g., short message service or SMS), a single sign-on prompt, security questions, security tokens, biometric authentication, passwords, challenge-response test (e.g., CAPTCHA tests), multi-factor authentication, behavior pattern matching (e.g., via machine learning models trained to identify a user based on Internet activity such as browsing history or transaction history), cookie-based authentication, out-of-band authentication, third-party verification, or any suitable combination thereof.

The parameter database 200 may store a record of different sequences of verification actions. For example, the parameter database 200 stores a record of the verification procedure beginning with a challenge-response test and followed by a password. In some embodiments, verification parameters are characterized by verification types. For example, verification parameters of "public network" and "on-premises network" may be characterized by a verification type of "network type." In some embodiments, the parameter database 200 stores an association between attributes of an enterprise and verification types. For example, the parameter database 200 stores a data structure associating enterprise attributes for a bank (e.g., institution type is "financial," presence type is "global," and security type is "high") with a verification sequence of multi-factor authentication followed by third-party verification.

The parameter database 200 may also store context parameters. The context parameters characterize the context of a potential request for interaction between a user and enterprise. In some embodiments, context parameters include types of networks (e.g., as characterized by an IP address), users, user groups, device trust levels, enterprise brands, device attributes (e.g., medium access control (MAC) address or a universally unique identifier (UUID) of a device), target resources requested, or any suitable combination thereof. For example, an employee of the enterprise 121 uses the user device 140, a personal tablet, to request access to proprietary documents from the enterprise 121 using the Wi-Fi network of the enterprise 121. The context parameters for this example include a network of "on-premises network", user group of "employee," device trust level of "public," and target resource requested of "enterprise content." As referred to herein, a "target resource" is a resource hosted by an enterprise and requested by a user or user device. Resources hosted by an enterprise include access to a software application (e.g., an email application), a document, a user account, configuration settings for a service used by the user, items available for purchase, monetary funds, an item or service provided to the user under privacy (e.g., needing identity verification), or any suitable combination thereof. A user's request to interact with an enterprise may include a request to access a target resource, which is provided upon identity verification by the verification system 160.

Context parameters may be predefined by the context-based verification system 160, created by an enterprise, or a combination thereof. In some embodiments, the verification system 160 creates predefined context parameters available to various enterprises or types of enterprises (e.g., a type of industry the enterprise operates in). For example, the verification system 160 defines user type context parameters of "employee," "client," and "guest" that may be selected by an enterprise. In some embodiments, the verification system 160 enables an enterprise to create custom context parameters. In creating a custom context parameter, the enterprise may specify a request context in which a particular identity verification policy is performed by the system 160. For example, the verification system 160 provides a GUI to an enterprise with user input elements for the enterprise to create a custom context parameter related to low and high risk IP addresses as determined by a third-party service system (e.g., a fraud engine). In this example, the third-party service may determine a custom request context parameter based on a user's request to interact with the enterprise, where the custom request context parameter represents information related to the user's request.

As will be described in the description of the verification flow identifier 215, a context parameter (e.g., the custom context parameter) may be referred to as a request context parameter (e.g., a custom request context parameter) when characterizing a user's request to interact with an enterprise in addition to being used by the verification system 160 to identify a verification flow. The user input elements may further include elements for providing instructions to the verification system 160. For example, the GUI may provide a text field for an enterprise administrator to provide a URL associated with the fraud engine.

In some embodiments, context parameters are characterized by context types. In some embodiments, the parameter database 200 stores an association between attributes of an enterprise and context types. For example, the parameter database 200 stores a data structure associating enterprise attributes for a university (e.g., institution type is "educational," presence type is "national," and security type is "medium") with context types that can represent typical users of the university such as student or professor, a research laboratory, or device types used such as personal or university-owned.

The stored data in enterprise verification flow database 205 includes a record of verification flows. A verification flow record may include a data structure associating verification parameters with context parameters. In some embodiments, the enterprise verification flow database 205 stores verification flows that are associated with enterprises. For example, the context-based verification system 160 receives selected verification and context parameters from the enterprise 120 and generates a data structure associating the enterprise 120 with a policy of the selected verification parameters that is further associated with the selected context parameters. In some embodiments, the enterprise verification flow database 205 stores conditional relationships between context parameters and associates those conditional relationships with stored verification flows. For example, the database 205 may store a verification flow record including a policy and associated instructions to evaluate one context parameter responsive to determining that a user's request to interact with an enterprise satisfies another context parameter. In some embodiments, the enterprise verification flow database 205 stores pre-generated verification flows and/or associated context parameters that may be recommended to an enterprise. For example, the context-based verification system 160 uses a machine learning model trained on existing relationships between enterprises and verification flows to generate a policy and/or set of context parameters that acts as a recommendation or template for an enterprise having particular attributes. This is further described in the description of the verification flow recommender 220.

In some embodiments, the context-based verification system 160 maintains a local database, the credential database 210, for storing credentials to verify the identity of a user. For example, the credential database 210 stores a user's security question responses, passwords, PINs, biometric data (e.g., representations of a fingerprint or iris), or any suitable personally identifiable information. The credential database 210 does not have to be local to the context-based verification system 160 and may be stored remotely or maintained by a third-party service provider (e.g., the third-party service system 150).

The verification flow identifier 215 identifies a verification flow for an enterprise to use for a given interaction request. The verification flow identifier 215 may identify a verification flow by matching context parameters in a verification flow to request context parameter that are provided by the user and/or enterprise when the user requests to interact with the enterprise. As referred to here, the term "request context parameters" refers to the context parameters that characterize a user's interaction request. The term "context parameter" may refer to parameters that characterize a verification flow (e.g., during verification flow customization) regardless of a user's interaction request. The user may provide request context parameters to the enterprise when requesting to interact with the enterprise and, in turn, the enterprise may provide those request context parameters to the context-based verification system 160. For example, a user device may broadcast wired and/or wireless signals that are received by an enterprise during the request to interact (e.g., access a webpage hosted by the enterprise). The signals may be analyzed for information about the interaction request such as device information (e.g., class of device indicating the type of user device) or network information (e.g., the IP address assigned to the user device). In some embodiments, the context-based verification system 160 receives a request from a user to interact with an enterprise or information regarding the request. For example, the enterprise 120 sends attributes of the request to the context-based verification system 160, the attributes including request context parameters (e.g., "on-premises network").

The context-based verification system 160 may then match the received request context parameters to the context parameters that characterize a particular verification flow created by and/or assigned to the enterprise 120. In some embodiments, matching request context parameters to context parameters is not a one-to-one match of each request context parameter. For example, the verification flow identifier 215 may not identify any verification flow that has all of the context parameters corresponding to the received request context parameters. In this circumstance, the verification flow identifier 215 may identify a verification flow that has the most context parameters corresponding to the received request context parameters (e.g., four out of five context parameters in a verification flow match the request context parameters).

The context-based verification system 160 may evaluate a subset of context parameters to determine which verification flow to use to verify a user. In some embodiments, a verification flow may have a conditional relationship between a first and second context parameter, where the second context parameter is not evaluated unless a user's request is characterized by the first context parameter. For example, a second context parameter retrieved from a third-party service system related to a risk level for an IP address is not evaluated unless a first context parameter indicating a user is of type "guest" is satisfied. This may optimize processing resources required of the verification system 160 by potentially evaluating a subset of context parameters rather than all of context parameters of a verification flow.

In some embodiments, the context-based verification system 160 may identify multiple verification flows that have all of the context parameters corresponding to the received request context parameters. For example, the three request context parameters received by the context-based verification system 160 are used in multiple verification flows that are each characterized more than the corresponding three context parameters. In this circumstance, the verification flow identifier 215 may identify a verification flow according to preferences set by the enterprise or according to priorities determined by the context-based verification system 160. For example, the enterprise 120 provides scores or ranks for the context parameters (e.g., ranked by importance) such that the verification flow identifier 215 may apply weights, based on those ranks, to the context parameters, score the multiple, matching verification flows, and identify a verification flow (e.g., the verification flow with the largest weighted score).

The verification flow recommender 220 of the context-based verification system 160 determines a recommended verification flow for an enterprise and its corresponding attributes. In some embodiments, an enterprise is not recognized by the context-based verification system 160 and the verification flow recommender 220 analyzes the enterprise to recommend a verification flow. For example, the context-based verification system 160 recommends a pre-generated verification flow to an enterprise that does not have a verification flow recorded in the enterprise verification flow database 205 because the enterprise has never received the services of context-based verification system 160. The verification flow recommender 220 includes the enterprise analyzer 221 and a verification flow engine 222.

The enterprise analyzer 221 analyzes information about an enterprise to determine attributes characterizing the enterprise. The context-based verification system 160 may prompt an enterprise to provide information for the enterprise analyzer 221 to determine a characterization. Alternatively, or additionally, the context-based verification system 160 may determine additional information about the enterprise based on a limited amount of information it receives. For example, the enterprise analyzer 221 determines, from the address of the enterprise, that the enterprise is a bureaucratic agency (e.g., queries a third-party database using the enterprise address). In some embodiments, the enterprise analyzer 221 determines a similarity between enterprises. Using the determined characterization, the enterprise analyzer 221 compares the characterization or a representation of the characterization to enterprises with verification flows maintained by the context-based verification system 160. The enterprise analyzer 221 may generate a representation of an enterprise such as a feature vector that encodes attributes of the enterprise for additional processing. For example, the enterprise analyzer 221 encodes the enterprise characterization into a feature vector.

The verification flow engine 222 determines a verification flow for an enterprise. The verification flow engine 222 may use the feature vector generated by the enterprise analyzer 221 to compare one enterprise to another. For example, the verification flow engine 222 may use cosine similarity to determine the similarity between two feature vectors representing respective enterprises. The engine 222 may determine similarity of between data sets representative of respective enterprises using correlation coefficients, cosine similarity, mean squared error, clustering algorithms (e.g., Euclidean clustering), or more generally any suitable technique for measuring the distance between data sets, or a combination thereof. The verification flow engine 222 may use the determined similarity to generate a verification flow as an output, where the generated verification flow is likely to be appropriate for both enterprises due to similarities between enterprises. In some embodiments, the verification flow engine 222 is a machine learning model configured to receive, as an input, enterprise attributes (e.g., encoded into a feature vector) and output at least one recommended verification flow, the verification flow including recommended verification parameters and context parameters. For example, the verification flow engine 222 receives a feature vector including numerical representation of the enterprise 120's user types, a risk assessment (e.g., based on the amount or level of proprietary information hosted by the enterprise), enterprise location, and enterprise size and outputs a recommended verification flow suitable for enterprises characterized by similar attributes as represented by the input feature vector. In some embodiments, the verification flow engine 222 is trained on data representative of existing verification flows used to verify users. For example, the context-based verification system 160 may generate a training set from verification flows in the enterprise verification flow database 205 and the enterprises associated with those verification flows.

In determining a verification flow for an enterprise, the verification flow engine 222 may determine a likelihood that an enterprise will use enterprise-created context parameters. For example, the engine 222 determines the similarity between enterprises, where one of the enterprises has created a custom context parameter determining which verification flow should be used for authentication or used for enrollment. The engine 222 may use a similarity threshold to determine whether to recommend the custom context parameter or a similar context parameter to another enterprise. The similar context parameter may be an anonymized form of the custom context parameter. For example, if the enterprise has chosen a custom context parameter instructing the verification system 160 to contact a particular fraud engine, the engine 222 may generate a recommendation to a similar enterprise to contact a fraud engine without specifying the particular fraud engine.

In some embodiments, the context-based verification system 160 receives feedback from an enterprise or user and re-trains the verification flow engine 222 using the received feedback. For example, the verification system 160 receives a measure of satisfaction from a user such as a score assessing his experience throughout the verification process. Based on the score, the verification system 160 may strengthen or weaken an association between enterprise attributes and a verification flow. For example, if the measure of satisfaction is positive (e.g., a high user score), the verification system 160 may strengthen an association between the feature vector input into the verification flow engine 222 and the verification flow output from the engine 222. Similarly, if the measure of satisfaction is negative (e.g., a low user score), the verification system 160 may weaken an association between the feature vector input into the verification flow engine 222 and the verification flow output from the engine 222.

In some embodiments, the feedback from the user is determined independent of the user providing it to the verification system 160. For example, the verification system 160 receives interaction information that characterizes the interaction of the user with the enterprise according to the user's interaction request. The interaction information may include a history of the user's activity on webpages hosted by the enterprise such as the address of webpages visited and the respective times at which the webpages were visited. The verification system 160 may determine, from this interaction information, that the user did not visit all of the webpages as planned according to the verification flow. For example, the verification flow may specify a verification procedure of a challenge-response test on a first webpage followed by a multi-factor authentication prompt on subsequent webpages before ultimately reaching a desired webpage on which requested, proprietary information is located. The verification system 160 may receive interaction information reflecting the user's successful progress through the first webpage and determine that the user did not reach the desired webpage. Using this unsuccessful interaction, the verification system 160 may update a training set having the association between a verification flow and enterprise attributed to the unsuccessful interaction.

The verification flow recommender 220 may transmit, to an enterprise, a recommended verification flow that is generated by the verification flow engine 222. For example, the verification flow recommender 220 transmits, over the network 110, a recommended verification flow having context parameters of the network type and verification parameters of "password" and "biometric identification" to the enterprise 121.

The identity verifier 225 verifies the identity of a user requesting to interact with an enterprise. The context-based verification system 160 may rely on a third-party system to verify the identity of the user in place of or in addition to the local identity verifier 225. In some embodiments, the identity verifier 225 receives the user's verification inputs (e.g., a password or responses to security questions) and verifies the inputs against the credentials stored in the credential database 210.

Process for Verifying User Identification Using a Verification Flow

Figure 3:
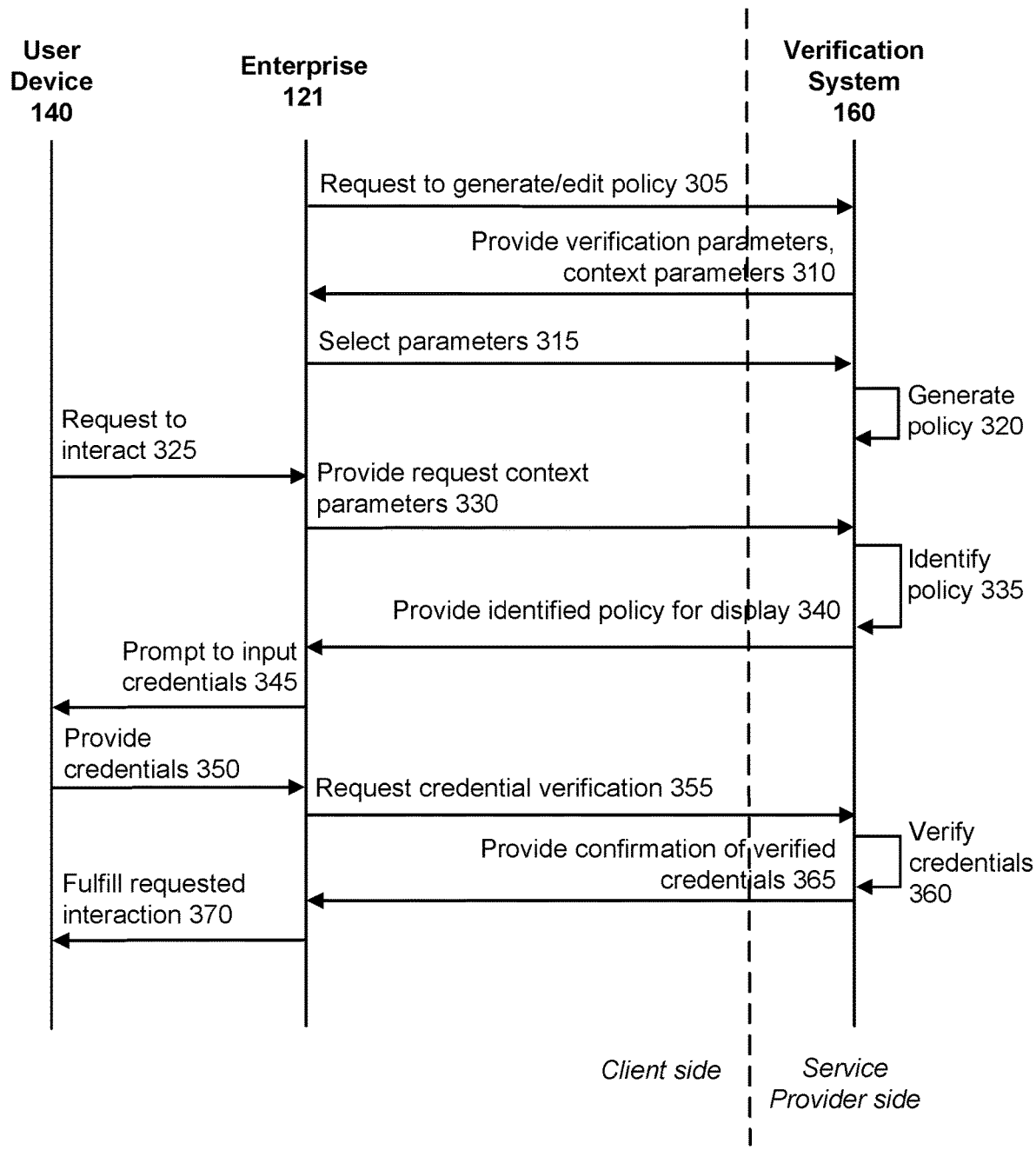
FIG. 3 illustrates the interactions that take place between different entities of FIG. 1 when fulfilling a user request to interact with an enterprise, in accordance with at least one embodiment.

FIG. 3 illustrates the interactions that take place between different entities of FIG. 1 when fulfilling a user request to interact with an enterprise. The enterprise 121 interacts with the context-based verification system 160 to generate a verification flow for verifying the identity of a user. When the user device 140 requests to interact with the enterprise 121, the enterprise 121 may use the generated verification flow and the verification system 160 to fulfill the requested interaction. In some embodiments, the interactions illustrated in FIG. 3 involve additional, fewer, or different functions or entities for performing the functions. For example, the third-party service system 150 may interact with the verification system 160 to identify an appropriate verification flow to verify the user device 140 (e.g., the identification 335 depicted in FIG. 3 as being performed by the verification system 160). The interactions of FIG. 3 may be facilitated by communication over the network 110.

The enterprise 121 initiates the interactions by requesting 305 to generate or edit a verification flow. The verification system 160 receives a transmitted request that may include information about the enterprise 121. For example, the user of the enterprise 121 may already have logged in to an account on the system 160, in which case the system 160 will already know information about it associated with its account. As another example, the request includes the IP address of the enterprise 121 to communicate the request. The verification system 160 may determine additional information using a reverse domain name system (DNS) lookup with the IP address (e.g., to determine a general geographic location of the enterprise 121). The request may include information submitted by the enterprise 121 (e.g., responsive to being prompted by the verification system 160 to provide the information).

The verification system 160 provides 310 verification and context parameters to the enterprise 121. The options may be provided through a GUI, as exemplified by FIGS. 4 & 5. The parameters provided may be recommended parameters based on the information received about the enterprise and/or a list of selectable parameters that the enterprise 121 may choose from. In some embodiments, the parameters are recommended to the enterprise 121 based on a determination by the verification system 160 of a recommended verification flow (e.g., using the verification flow recommender 220). If the enterprise 121 chooses to customize its own verification flow, the enterprise 121 may edit the generated, recommended verification flow or select parameters itself. The enterprise 121 selects 315 verification and context parameters and the verification system 160 receives an indication of the selected parameters.

Using the parameters selected by the enterprise 121, the verification system 160 may generate 320 a verification flow. For example, the verification system 160 generates a data structure associating the selected verification parameters with the selected context parameters and store the data structure into the enterprise verification flow database 205. This generated data structure includes the verification flow and an indication or label of the enterprise 121 such that the enterprise verification flow database 205 may be queried by an enterprise label to find verification flows generated for a particular enterprise. In some embodiments, the enterprise 121 receives and accepts the recommended verification flow generated by the verification flow recommender 220. The verification system 160 may then store the verification flow with an association with the enterprise 121 in the enterprise verification flow database 205 for subsequent verification flow identification or re-training the verification flow recommender 220.

The user device 140 requests 325 to interact with the enterprise 121. For example, the user device 140 is a tablet used by an employee of the enterprise 121. The employee intends to use the tablet and the Wi-Fi network hosted by the enterprise 121 to access his work email account. The act of requesting to interact may involve opening a software application accessing the network 110 through Wi-Fi network of the enterprise 121. For example, the user device 140 is used to open an email application to access a work email account. The request to interact may include information or request context parameters such as the IP address of the Wi-Fi network, the device trust level (e.g., an "untrusted" device because it has not been registered as associated with the employee or the IP address before), the device type (e.g., a tablet computer), and the target resource (e.g., the email application). Responsive to receiving the request, the enterprise 121 provides 330 the request context parameters to the verification system 160. For example, the enterprise 121 transmits the request context parameters over the network 110 to the verification system 160. Using the received request context parameters, the verification system 160 may identify 335 a verification flow suited for the request context parameters. The verification system 160 may use any suitable method as described in the description of verification flow identifier 215. For example, the verification flow identifier 215 may identify 335 the verification flow that satisfies the most request context parameters provided 330 by the enterprise 121. Based on the network, device trust level, device type, and target resource, the verification flow identifier 215 may identify 335 a verification flow characterized by matching device trust level and device type.

In some embodiments, the verification system 160 communicates with the third-party service system 150 to identify 335 the verification flow. For example, the verification system 160 directs information received about the enterprise 121 to the third-party service system 150 which analyzes the information to return an evaluation of the enterprise 121 (e.g., a risk assessment score, a probability of the user device having malware, etc.). The verification system 160 may identify 335 a verification flow based on the evaluation. For example, it may identify a verification flow characterized by a context parameter matching the risk assessment score. In some embodiments, the verification system 160 communicates with the third-party service system 150 responsive to an enterprise administrator request. For example, the enterprise 121 uses a GUI provided by the verification system 160 to provide a user input to specify the third-party service system 150 and request that the verification system 160 contact the third-party service system 150 to provide 330 a context parameter for identifying 335 a verification flow.

This requested contact to a third-party service system may be for a context parameter customized by the enterprise 121 (i.e., not necessarily provided 310 by the verification system 160 to the enterprise 121). In this way, enterprises using the verification system 160 may further personalize verification flows to metrics commonly associated with the enterprises' industries. For example, an enterprise in a retail commerce industry may use a third-party service system, such as a fraud engine, to lower the likelihood of unauthorized purchases. The enterprise requests that the verification system 160 contact the fraud engine to determine a context parameter associated with a user's request to interact with the enterprise (i.e., a request context parameter) and identify a verification flow with the determined request context parameter. In this example, the determined request context parameter may be provided by the fraud engine, specifying that the IP address of the user requesting to interact with the enterprise has previously been linked to unauthorized purchases. The verification system 160 may use the determined request context parameter to deny the user's request to interact with the enterprise or determine a particular verification flow specified by the enterprise to authenticate users linked to high-risk IP addresses.

The identified verification flow may be provided 340 to the enterprise 121 by the verification system 160. For example, the verification system 160 provides instructions to the enterprise 121 to execute a sequence of steps for the user to provide 350 credentials for verification. Although depicted in FIG. 3 as the enterprise 121 prompting 345 the user device 140 to input credentials, the verification system 160 may prompt 345 the user device 140 instead or collaboration with the enterprise 121. For example, the verification system 160 may, through a local network hosted by the enterprise 121, provide for display a GUI to prompt 345 the user to input his credentials. For example, the verification system 160 may make a webpage file (e.g., HTML, file) available for the enterprise 121 or the user device 140 to download such that the user can provide 350 credentials after being prompted 345 to input his credentials. Credentials may include any of the credentials as described in the description of the credential database 210.

An enterprise may be associated with multiple verification flows, where each verification flow is associated with a respective brand. For example, an enterprise is a loyalty program provider that allows other enterprises without their own loyalty program to rely on the provided loyalty programs instead (e.g., hotels that use the loyalty program provider's infrastructure). The loyalty program provider may provide 330 context parameters that include a web URL from which the request was directed, the web URL including a keyword indicating a particular hotel that receives services from the loyalty program provider. The verification system 160 may use this context parameter to determine a verification flow that is associated with the particular hotel's brand. For example, the verification system 160 may determine a verification flow to be generated for display at the user device that includes an image of the brand's logo or includes text associated with the brand (e.g., a slogan). In this way, the loyalty program provider may be associated with multiple verification flows, where each verification flow can be used such that the verification method applied at a user device features the appropriate branding based on the hotel.

In some embodiments, the enterprise 121 receives the credentials provided 350 by the user device 140 and requests 355 that the verification system 160 perform credential verification. The verification system 160 may receive the credentials received from the user device 140 and/or the enterprise 121. Techniques that the verification system 160 may follow to verify 360 the credentials, and thereby verifying the user device 140 or the user of the user device 140, include ad hoc credential generation and incremental verification progression.

In some embodiments, credentials are generated ad hoc. A unique verification identifier is generated by the verification system 160 or a third-party service provider to verify a user's identification without having to maintain credentials set by the user (e.g., a password chosen by a user). For example, the verification system 160 generates a web address or URL with a passcode encoded within the URL for the enterprise 121 to send to the user device 140 (e.g., through an email or SMS). In some embodiments, the unique verification identifier may be used in addition to credentials set by the user. For example, for additional security, a user may be prompted 345 by the verification system 160 to provide a password in order to access the unique verification identifier generated as needed when the user provides the correct password.

In some embodiments, verification is accomplished in an incremental progression as the user is accessing more and more of the requested resources provided by the enterprise 121. For example, the enterprise 121 may establish a verification flow using the verification system 160 to divide verification requirements by resources accessed. A user may enroll with the enterprise 121 to access the purchasing service offered by the enterprise 121. The enterprise 121 may have a verification flow that specifies, through a first verification parameter, that a user begins an enrollment to use the services of the enterprise 121 by registering with an email address and password. After the verification system 160 receives the email address and password credentials, the verification system 160 may provide a resource to the user device 140 that fulfills a portion of the request. For example, the first resource is access to a homepage of a website hosted by the enterprise 121. The verification flow may, through additional verification parameters, specify that the user must further his enrollment by providing more credentials (e.g., a mailing address and mobile number) for the user to use additional resources from the enterprise. For example, the verification system 160 may provide the user device access to a webpage of the website hosted by the enterprise 121 that allows the user to make a purchase after receiving a mailing address and mobile number. This may encourage users to continue using or registering to use an enterprise's services because the incremental verification enables an impression of a smoother experience without an overly cumbersome verification process upfront.

The verification system 160 may verify 360 the credentials. For example, the verification system 160 queries the credential database 210 for a credential associated with the user of the user device 140. If the credential database 210 contains a match for the password, the verification system 160 may confirm the credentials have been verified and provide 365 an indication to the enterprise 121 of this verification. In some embodiments, the verification system 160 may use a third party service provider to verify credentials provided 350 by the user device 140. For example, the user device 140 is used to enroll with a service provided by the enterprise 121 and an address and phone number are provided for enrollment. The enterprise 121 may provide the verification system 160 these credentials, and the verification system 160 may, in turn, provide the credentials to the third party service system 150. The third party service system 150 may match the address and phone number to a record of valid addresses and mobile numbers and provide confirmation to the verification system 160 that the credentials are legitimate.

After verifying 360 the credentials, the verification system may provide 365 confirmation of the verified credentials. For example, after verifying the password provided is correct, the verification system 160 sends instructions to the enterprise 121 to change the access permissions of a webpage that the user device 140 is requesting. In this way, the user device 140 can successfully download the webpage, fulfilling 370 the requested interaction. In another example, after verifying credentials provided during an enrollment with the enterprise 121, the verification system 160 may change the access permissions of webpages related to a resource (e.g., purchasing goods) that the user is enrolling to use, fulfilling 370 the requested interaction.

The verification system 160 may, although not depicted in FIG. 3, verify credentials for another user device or user (e.g., the user device 141). In some embodiments, the user device 141 requests to interact with enterprise 121 in a similar process as depicted in FIG. 3. The request context parameters provided by the enterprise 121 for the user device 141's request may be different from the request context parameters provided 330 for the user device 140's request. For example, the user device 141 may be a device type associated with a mobile phone rather than the user device 140's device type associated with a tablet. Based on the request context parameters provided for the user device 141's request, the verification system 160 identifies a verification flow for the user device 141 to begin a verification process. The identified verification flow could be the same verification flow identified 335 or the identified verification flow could be different. In some embodiments, the user of the user device 140 and the user device 141 are the same user who is requesting to interact with the enterprise 121 with two different devices.

Exemplary Context-Based Verification System User Interfaces

Referring now to FIGS. 4 through 5, illustrated are examples of GUIs provided for display to a client device for customizing a verification flow for identity verification using the context-based verification system described herein. The context and verification parameters presented in the GUIs 400 and 500 shown in FIGS. 4 and 5, respectively, may be selected by an administrator or pre-populated by the verification system 160. For example, the verification flow recommender 220 may determine a recommended verification flow to pre-populate the fields of the GUIs. In alternative configurations, different and/or additional components may be included in the GUIs 400 and 500. For example, the administrator may request an additional context parameter (e.g., a target resource) to characterize the verification flow, and the GUI 400 may be designed by verification system 160 to display, upon user request, an additional dropdown menu for specifying a target resource. The verification system 160 may provide the GUIs 400 and 500 for display at client devices (e.g., the client device 130) for an enterprise administrator to interact with.

FIG. 4 depicts a GUI 400 for creating a verification flow for authentication using the context-based verification system 160. The GUI 400 allows an enterprise to generate or edit a verification flow to authenticate a user through various dropdown menus, text boxes, radio buttons, and conditional statements. In particular, the verification flow is structured such that if a particular permutation of context parameters is met by the context parameters of a user's request to interact with an enterprise (i.e., request context parameters), then a particular permutation of verification parameters is used to identify the user for authentication.

For example, the verification system provides 310 verification and context parameters for display through the GUI 400 to the client device 130 of the enterprise 120. The dropdown menus 401a-401d enable the administrator using the client device 130 to select the context parameters 402a-402d to associate with the verification parameters 404. The context dropdown menus 401a-401d provide a list of selectable context parameters related to user type, group membership, request origin, and device trust status, respectively. The administrator selects the context parameters 402a-402d such that the verification flow is used when the request context parameters match or substantially match the selected context parameters 402a-402d. The verification flow generated by the parameters shown in the GUI 400 may specify that "if the user type is 'employee' and the group membership includes 'Group 1' and the request is from the zone 'on-premises' and the device trust status is 'Trusted,' then access is 'allowed after successful authentication' and authenticate using a 'password.'"

The administrator may add a custom context parameter using a context parameter customization button 403. Upon receiving user input that the administrator has selected the customization button 403, the verification system 160 may generate additional user interface elements that enable a user to specify instructions for the custom context parameter. For example, the verification system 160 may provide a text field for the administrator to specify a URL to a third-party service system. The verification system 160 uses the specified URL to retrieve a request context parameter from the third-party service system.

As referred to herein, "substantially matching" may include the identification of a verification flow that matches each context parameter characterizing the verification flow to the request context parameters of the user's request and/or the identification of a verification flow whose context parameters match more to the request context parameters of the user's request relative to other verification flows (i.e., the identified verification flow's context parameters does not necessarily match each of the user request's context parameters), as described in the description of the verification flow identifier 215.

FIG. 5 depicts a GUI 500 for creating a verification flow for enrollment using the context-based verification system 160. The GUI 500 allows an enterprise to generate or edit a verification flow to enroll a user through various dropdown menus, text boxes, radio buttons, and conditional statements. Similar to the verification flow specifiable using the GUI 400, the verification flow is structured such that if a particular permutation of context parameters is met by the context parameters of a user's request to interact with an enterprise (i.e., request context parameters), then a particular permutation of verification parameters is used to identify the user for enrollment. For example, the identification provides 310 verification and context parameters for display through the GUI 500 to the client device 130 of the enterprise 120. The dropdown menus 501a-501c enable the administrator using the client device 130 to select the context parameters 502a-502c to associate with the verification parameters 504. Similar to the GUI 400, the GUI 500 includes a context parameter customization button 503 to enable an administrator to further customize a context parameter for the enrollment verification flow. The context dropdown menus 501-501c provide a list of selectable context parameters related to user type, target resource or application requested, and request origin, respectively. The administrator selects context parameters 502a-502c such that the verification flow is used when the request context parameters match or substantially match the selected context parameters 502a-502c. The verification flow generated by the parameters shown in GUI 500 may specify that "if the user type is 'employee' and the target application is 'any application' and the request is from the zone 'on-premises,' then enrollment is 'required' and active users must authenticate with credentials through 'one of the Email and SMS.'"

Computing Machine Architecture

Figure 6:
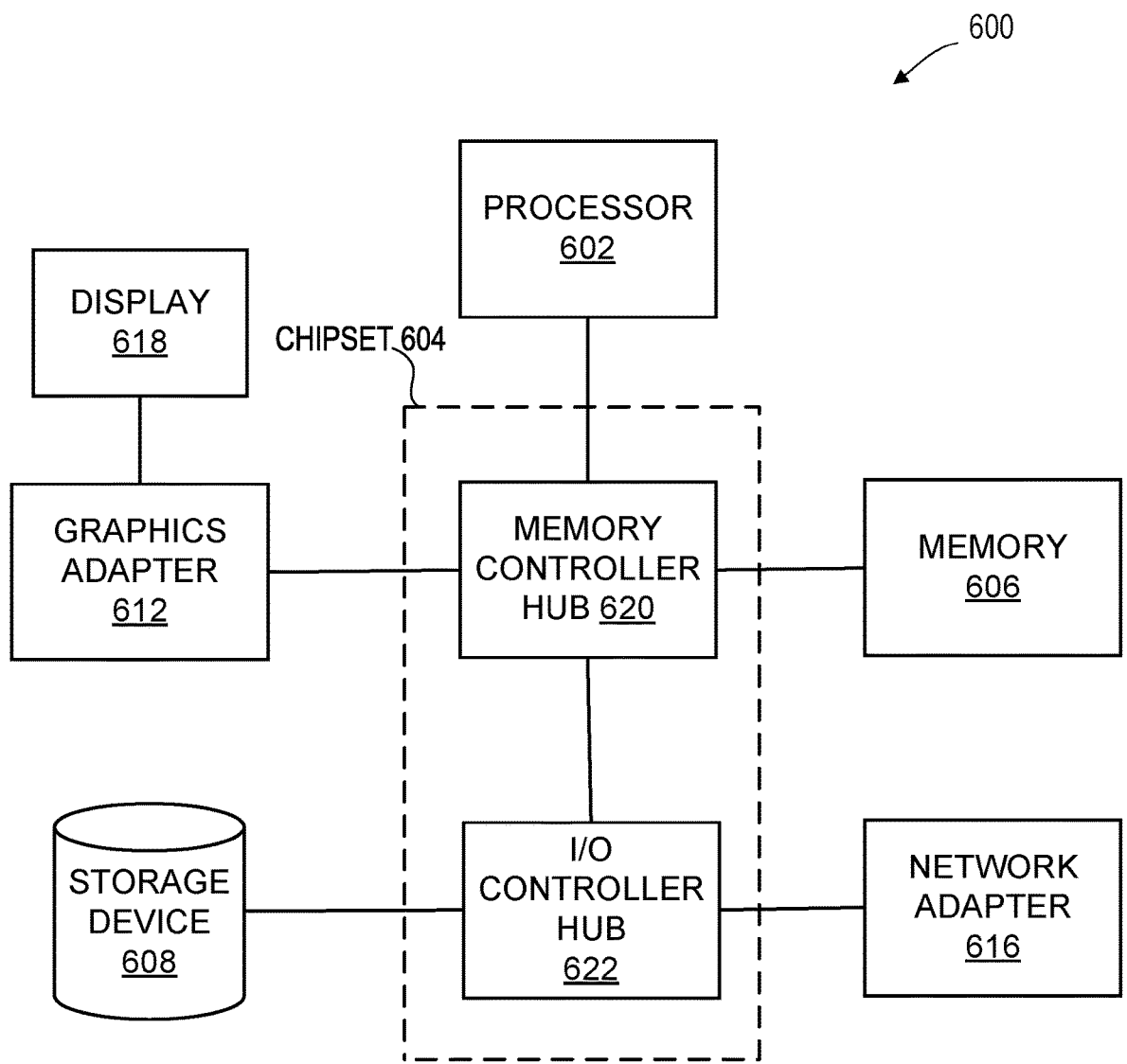
FIG. 6 is a block diagram illustrating physical components of a computer used as part of all of the client device or verification service provider

FIG. 6 is a high-level block diagram illustrating physical components of a computer 600 used as part or all of the client device 130, the user devices 140-141, and/or the context-based verification system 160 from FIG. 1, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller huh 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600, The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein, As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Embodiments of the entities described herein can include other and/or different modules than the ones described here.

In addition, the functionality attributed to the modules can be performed by other or different modules in other embodiments.

Additional Configuration Considerations

Example benefits and advantages of the disclosed configurations include customizable verification flows to adapt to the risk level of the request and/or resource being requested. The context-based verification system described herein maintains verification flows for enterprises, where a single enterprise may be associated, by the verification system, with at least one verification flow for an enterprise. In this way, the verification system is relied upon to serve a variety of users of an enterprise, the users requesting access to various resources provided by the enterprise. The verification system may optimize the verification flows generated for the enterprises based on existing verification flows. Verification flows may be automatically recommended to an enterprise that account for attributes of the enterprise such as the type of services it provides, the users it interacts with, and the risk level associated with providing those services to users.

The verification system may determine the context of a user's request to an enterprise. The verification system uses the determined context to identify a corresponding verification policy from a set of possible policies, which provides an improvement over existing systems that use the same verification policy regardless of the circumstances prompting verification. By providing a tailored verification experience, the verification system increases the likelihood that a user continues to engage with an enterprise by determining an appropriate verification method for the user and what he is requesting from the enterprise. In particular, for digital identity verification of a user requesting a digital resource from an enterprise (e.g., accessing a webpage hosted by the enterprise), an appropriate verification method can be determined based on digital fingerprints associated with the request. For example, the IP address used by the user in making the request over the Internet may be used by the verification system to determine a verification flow generated for that IP address.

Additional benefits provided to administrators by the context-based verification system arise from providing a GUI to generate and customize the administrators' verification flows rather than limiting administrators to using code. While a code may allow the administrator more flexibility in customizing their verification flow, not all administrators may be familiar with computer language. By providing a GUI to an enterprise to generate verification flows for verifying the identification of the users of the enterprise, the context-based verification system does not require administrators at the enterprise to write computer code. However, using a GUI introduces an additional challenge to the context-based verification system to provide a GUI that can represent the necessary controls for managing verification flows while ensuring ease of use for the administrator (i.e., without overwhelming an administrator with too many different controls).

The context-based verification system addresses this challenge by focusing on different aspects of the identity experience flow, which allows administrators to individually target each aspect of the flow they want to change. For example, the context-based verification system can separate authentication verification flows from user registration verification flows, providing distinct GUI's for an administrator to edit each verification flow. In this way, rather than prioritize the context of the identity experience and leave an administrator to customize an entire experience for a particular set of context parameters, the context-based verification system partitions the identity experience into multiple, manageable aspects.

Furthermore, the use of a GUI provides benefits such as the visualization of the different aspects of the identity experience flow and sub-aspects or "steps" associated with each aspect. For example, in the GUI 400, each of the context parameters 404 depicted for an administrator may be a step of the authentication aspect of an identity experience. One or more steps may be associated with respective extensibility points, where each extensibility point indicates where the context-based verification system interacts with an extension, and expression language used by the context-based verification system can interpret each extension's responses. In some embodiments, extensions can be an enterprise's customized code such that, at an extensibility point, an enterprise can inject their own code and tailor a verification flow's behavior in addition to customizing a selection of verification flow parameters offered by the context-based verification system. Because the different sub-aspects are depicted in a GUI, the context-based verification system enables an administrator to more easily identify extensibility points.

The context-based verification system's use of expression language may also provide additional benefits by being more flexible than a GUI and more accessible to administrators than other computer languages. Expression language may allow the context-based verification system to handle a variety of responses from extensions. For example, rather than use special integration software for each extension's response, enterprise administrators may directly interact with extension responses via expression language, regardless of whether the extensions have ever been used with the context-based interaction system before.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for flexible, context-based identification for fulfilling interaction requests through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method performed by a web-based verification system, the method comprising:
   providing a plurality of context parameters to a first enterprise and a second enterprise, the plurality of context parameters representing types of request context for requesting to interact with an enterprise;
   providing a plurality of verification parameters to the first enterprise and the second enterprise, the plurality of verification parameters representing types of identity verification;
   determining a first verification flow associated with the first enterprise, the first verification flow comprising a first set of the plurality of context parameters and a first set of the plurality of verification parameters;
   determining a second verification flow associated with the first enterprise, the second verification flow comprising a second set of the plurality of context parameters and a second set of the plurality of verification parameters;
   determining a third verification flow associated with the second enterprise, the third verification flow comprising a third set of the plurality of context parameters and a third set of the plurality of verification parameters;
   receiving a request from a user to interact with the first enterprise;
   determining a plurality of request context parameters of the request;
   determining whether the plurality of request context parameters substantially matches the first set of the plurality of context parameters;
   responsive to determining the plurality of request context parameters substantially matches the first set of the plurality of context parameters:
      verifying an identity of the user using the first set of the plurality of verification parameters; and
   responsive to determining the plurality of request context parameters substantially matches the second set of the plurality of context parameters:
      verifying the identity of the user using the second set of the plurality of verification parameters.

2. The computer-implemented method of claim 1, wherein determining the first verification flow associated with the first enterprise comprises:
   generating for display, to the first enterprise, a graphical user interface comprising at least one listing comprising the plurality of context parameters and the plurality of verification parameters; and
   receiving, from the first enterprise via the graphical user interface, a selection of the first set of the plurality of context parameters and a selection of the first set of the plurality of verification parameters.

3. The computer-implemented method of claim 1, wherein determining the first verification flow associated with the first enterprise comprises:
   receiving, from a third-party service, an evaluation of at least one of the first enterprise, the received request, the user, or a user device associated with the user; and
   determining, based on the evaluation, the first verification flow associated with the first enterprise.

4. The computer-implemented method of claim 1, wherein determining the first verification flow associated with the first enterprise comprises:
   generating, based on a machine learning model, the first verification flow, the machine learning model configured to receive as input a plurality of enterprise attributes and output a recommended plurality of verification parameters and a recommended plurality of context parameters.

5. The computer-implemented method of claim 4, wherein the machine learning model is trained on data representative of existing verification flows used to verify users.

6. The computer-implemented method of claim 5, further comprising:
   receiving a measure of satisfaction from the user; and
   re-training the machine learning model based at least in part on the received measure of satisfaction.

7. The computer-implemented method of claim 6, wherein re-training the machine learning model comprises:
   strengthening an association between the plurality of enterprise attributes and the first verification flow in response to the measure of satisfaction being a positive measure of satisfaction, and
   weakening the association between the plurality of enterprise attributes and the first verification flow in response to the measure of satisfaction being a negative measure of satisfaction.

8. The computer-implemented method of claim 4, further comprising:
   receiving interaction information characterizing an interaction of the user with the first enterprise according to the request;
   updating a training set using the received interaction information; and
   re-training the machine learning model using the updated training set.

9. The computer-implemented method of claim 1, wherein determining the first verification flow associated with the first enterprise comprises:
   encoding a plurality of enterprise attributes characterizing the first enterprise into a feature vector;
   determining, based on the feature vector, a similar enterprise, the similar enterprise characterized by at least one of the plurality of enterprise attributes characterizing the first enterprise; and
   determining to use the first verification flow for the first enterprise, the first verification flow also used by the similar enterprise.

10. The computer-implemented method of claim 9, wherein the feature vector is a first feature vector, and
   wherein determining, based on the feature vector, the similar enterprise comprises:
      encoding a plurality of enterprise attributes characterizing the similar enterprise into a second feature vector; and
      calculating a cosine similarity between the first feature vector and the second feature vector.

11. The computer-implemented method of claim 1, wherein determining the plurality of request context parameters of the request comprises:
   determining, from the request, at least one of a target resource, an organization of the user, a device serial number, a device model number, a universally unique identifier (UUID), geographic coordinates, an IP address, or a MAC address.

12. The computer-implemented method of claim 1, further comprising:
determining a fourth verification flow associated with the second enterprise, the fourth verification flow comprising a fourth set of the plurality of verification parameters and a fourth set of the plurality of context parameters.

13. The computer-implemented method of claim 12, wherein the plurality of request context parameters is a first plurality of request context parameters, wherein the request is a first request, and wherein the user is a first user, and wherein the method further comprises:
receiving a second request from a second user to interact with the second enterprise;
determining a second plurality of request context parameters of the second request;
determining whether the second plurality of request context parameters of the second request substantially matches the third set of the plurality of context parameters;
responsive to determining the second plurality of request context parameters of the second request substantially matches the third set of the plurality of context parameters:
verifying an identity of the second user using the third set of the plurality of verification parameters; and
responsive to determining the second plurality of request context parameters of the second request substantially matches the fourth set of the plurality of context parameters:
verifying the identity of the second user using the fourth set of the plurality of verification parameters.

14. The computer-implemented method of claim 1, wherein determining whether the plurality of request context parameters substantially matches the first set of the plurality of context parameters comprises:
determining a plurality of verification flows associated with the first enterprise, each of the plurality of verification flows associated with the first enterprise comprising at least one of the plurality of request context parameters, the plurality of verification flows comprising the first verification flow associated with the first enterprise and the second verification flow associated with the first enterprise;
determining, based on a plurality of weights, a first weighted score for the first set of the plurality of context parameters, the plurality of weights assigned to respective context parameters of the plurality of verification flows;
determining, based on the plurality of weights, a second weighted score for the second set of the plurality of context parameters; and
determining that the first weighted score is greater than the second weighted score.

15. The computer-implemented method of claim 1, wherein verifying the identity of the user using the first set of the plurality of verification parameters comprises generating a first verification user interface comprising a first branded layout emphasizing a first brand.

16. The computer-implemented method of claim 15, wherein verifying the identity of the user using the second set of the plurality of verification parameters comprises generating a second verification user interface comprising a second branded layout emphasizing a second brand.

17. The computer-implemented method of claim 1, wherein verifying the identity of the user using the first set of the plurality of verification parameters comprises:
providing, to a secured account of the user, a unique verification identifier, wherein the unique verification identifier is at least one of a uniform resource locator (URL) or matrix barcode; and
responsive to receiving information indicating that the user has interacted with the unique verification identifier, fulfilling the request.

18. The computer-implemented method of claim 1, wherein verifying the identity of the user using the first set of the plurality of verification parameters comprises:
receiving a first identification verifier; and
responsive to verifying validity of the first identification verifier:
providing the user a first resource from the first enterprise, wherein the first resource fulfills a first portion of the request;
receiving a second identification verifier; and
responsive to verifying validity of the second identification verifier:
providing the user a second resource from the first enterprise, wherein the second resource fulfills a second portion of the request.

19. A non-transitory computer-readable storage medium storing instructions, the instructions when executed by a processor of a context-based verification system cause the processor to perform actions comprising:
providing a plurality of context parameters to a first enterprise and a second enterprise, the plurality of context parameters representing types of request context for requesting to interact with an enterprise;
providing a plurality of verification parameters to the first enterprise and the second enterprise, the plurality of verification parameters representing types of identity verification;
determining a first verification flow associated with the first enterprise, the first verification flow comprising a first set of the plurality of context parameters and a first set of the plurality of verification parameters;
determining a second verification flow associated with the first enterprise, the second verification flow comprising a second set of the plurality of context parameters and a second set of the plurality of verification parameters;
determining a third verification flow associated with the second enterprise, the third verification flow comprising a third set of the plurality of context parameters and a third set of the plurality of verification parameters;
receiving a request from a user to interact with the first enterprise;
determining a plurality of request context parameters of the request;
determining whether the plurality of request context parameters substantially matches the first set of the plurality of context parameters;
responsive to determining the plurality of request context parameters substantially matches the first set of the plurality of context parameters:
verifying an identity of the user using the first set of the plurality of verification parameters; and
responsive to determining the plurality of request context parameters substantially matches the second set of the plurality of context parameters:

verifying the identity of the user using the second set of the plurality of verification parameters.

20. A context-based verification system comprising:
a computer processor; and
a non-transitory computer-readable storage medium storing instructions, the instructions when executed by a processor of the context-based verification system cause the processor to perform actions comprising:
    providing a plurality of context parameters to a first enterprise and a second enterprise, the plurality of context parameters representing types of request context for requesting to interact with an enterprise;
    providing a plurality of verification parameters to the first enterprise and the second enterprise, the plurality of verification parameters representing types of identity verification;
    determining a first verification flow associated with the first enterprise, the first verification flow comprising a first set of the plurality of context parameters and a first set of the plurality of verification parameters;
    determining a second verification flow associated with the first enterprise, the second verification flow comprising a second set of the plurality of context parameters and a second set of the plurality of verification parameters;
    determining a third verification flow associated with the second enterprise, the third verification flow comprising a third set of the plurality of context parameters and a third set of the plurality of verification parameters;
    receiving a request from a user to interact with the first enterprise;
    determining a plurality of request context parameters of the request;
    determining whether the plurality of request context parameters substantially matches the first set of the plurality of context parameters;
    responsive to determining the plurality of request context parameters substantially matches the first set of the plurality of context parameters:
        verifying an identity of the user using the first set of the plurality of verification parameters; and
    responsive to determining the plurality of request context parameters substantially matches the second set of the plurality of context parameters:
        verifying the identity of the user using the second set of the plurality of verification parameters.

* * * * *